US00RE42652E

(19) United States
(12) Reissued Patent
Musso et al.

(10) Patent Number: US RE42,652 E
(45) Date of Reissued Patent: Aug. 30, 2011

(54) NEAR-AZEOTROPIC TERNARY COMPOSITIONS CONSTITUTED BY HYDROGENATED FLUOROCARBONS AND HYDROCARBONS, SUITABLE AS REFRIGERATING FLUIDS

(75) Inventors: Ezio Musso, Casterletto D'Orba (IT); Sauro Girolomoni, Spinetta Marengo (IT); Giampiero Basile, Allessandria (IT)

(73) Assignee: Solvay Solexis SpA (IT)

(21) Appl. No.: 11/361,033

(22) Filed: Feb. 23, 2006

Related U.S. Patent Documents

Reissue of:
(64) Patent No.: 6,695,973
Issued: Feb. 24, 2004
Appl. No.: 08/768,378
Filed: Dec. 17, 1996

(30) Foreign Application Priority Data

Dec. 14, 1995 (IT) ..... MI95A002627

(51) Int. Cl.
*C09K 5/04* (2006.01)
(52) U.S. Cl. ..... 252/67
(58) Field of Classification Search ..... 252/67
See application file for complete search history.

(56) References Cited

U.S. PATENT DOCUMENTS

| | | | | |
|---|---|---|---|---|
| 4,174,295 | A | 11/1979 | Bargigia et al. | |
| 4,810,403 | A | 3/1989 | Bivens et al. | |
| 5,182,040 | A | 1/1993 | Bartlett et al. | |
| 5,425,890 | A * | 6/1995 | Yudin et al. | 252/67 |
| 5,458,798 | A * | 10/1995 | Lunger et al. | 252/67 |
| 5,620,631 | A | 4/1997 | Heiskel et al. | |
| 5,650,089 | A * | 7/1997 | Gage et al. | 252/67 |
| 5,668,432 | A * | 9/1997 | Tominaga et al. | 310/328 |
| 5,688,432 | A | 11/1997 | Pearson | |
| 5,766,511 | A * | 6/1998 | Musso et al. | |

FOREIGN PATENT DOCUMENTS

| | | | |
|---|---|---|---|
| EP | 0299614 | | 1/1989 |
| EP | 0299614 | A2 | 1/1989 |
| EP | 03854371 | | 2/1990 |
| EP | 0384371 | A1 | 8/1990 |
| EP | 0539952 | * | 5/1993 |
| EP | 94/00529 | * | 10/1993 |
| EP | 0565265 | * | 10/1993 |
| EP | 0565265 | A1 | 10/1993 |
| EP | 0638623 | | 2/1995 |
| EP | 0638623 | A1 | 2/1995 |
| JP | 1-139675 | * | 6/1989 |
| JP | 01/139675 | A | 6/1989 |
| JP | 1-139678 | * | 6/1989 |
| JP | 01/139678 | A | 6/1989 |
| JP | 3-168273 | * | 7/1991 |
| WO | 9217558 | | 3/1992 |
| WO | WO-92/17558 | A1 | 10/1992 |
| WO | 9400529 | | 6/1993 |
| WO | WO-94/00529 | A1 | 1/1994 |
| WO | 94/26835 | * | 11/1994 |
| WO | 95/08602 | * | 3/1995 |

OTHER PUBLICATIONS

D.A. Didion and D.B. Bivens—Role of refrigerant mixtures as alternatives to CFCs.—International Journal of Refrigeration, 1990, vol. 13, p. 163-175.
D. Butler—R22 drop-in a success at BRE—Refrigeration and Air conditioning. Sep. 1994, 49-50.
S.F. Pearson—Use of hydrocarbon refrigerants—IIF IIR Commisions B1, B2, El, and E2—Aarthus Denmark 1996-3, p. 439-446.
N. A. Roberts and S.F. Pearson—High efficiency R22 replacement (ISCEON 59, a mixture or RF125, R134a and isobutane)—US 1996 Pap. 1996 Int. Compressor Eng. Conf. Purdue, Jul. 23-26, 1996.
N. A. Roberts and S.F. Pearson—High efficiency R22 replacement—US 1996 Pap. 1996 Int. Compressor Eng. Conf. Purdue, Jul. 1996.
Cesare Soffientini, Mark W. Spatz, Samuel Yana Motta, Elizabet Vera Becerra—CENTRO Studi Galilieo—Industria & Formazione—"Evaluation of Alternative Refrigerants When Retrofitting R-22 Refrigeration Systems"—11th European Conference Milan Jun. 17/18, 2005.
Fluorocarbon Azeotropes—Research Disclosure 16265, Oct. 1977.
N.A. Roberts—Determination of the performance, leak scenario, flammability and oil return characteristics of novel R22 replacement—Proceedings of the 1998 International Refrigeration Conference Purdue—E.A. Broil and J.E. Braun Editors—pp. 25-30, Jul. 1998.
N.A. Roberts—Energy Saving Refrigerant blends comprising R125, R134A, R600 or R600a—European Conference Milane pp. 1-9, Jun. 7-8, 2005.
Test Protocol for determination of Refrigerant properties.
ASHRAE Standard 34-2001, Designation and Safety Classification of Refrigerants, pp. 7 and 13, 2001.
Kühn Birett—Merkblätter Gefährliche Arbeits-Stoffe—94 Erg. Lfg., B037-1-B037-2 and B060-1-2, Dec. 1996.
David P Wilson et al., Determination of Refrigerant Lower Flammability Limits in Compliance with Proposed Addendum p to Standard 34,—Ashrae Transaction Symposia, 739-756, 2001.
D17 Test Protocol for determination of Refrigerant properties dated Mar. 30, 2006.
Didion, D. A. and D. B. Bivens May 1990, "Role of refrigerant mixtures as alternatives to CFCs," Int. Refrig., vol. 13, p. 163-168.

* cited by examiner

*Primary Examiner* — Gregory W Webb
(74) *Attorney, Agent, or Firm* — Connolly Bove Lodge & Hutz LLP

(57) ABSTRACT

Near-azeotropic ternary compositions of hydrofluorocarbons with n-butane or isobutane selected from:

| | | |
|---|---|---|
| A) | 1,1,1,2-tetrafluoroethane (R134a) | 65-94% by weight |
| | pentafluoroethane (R125) | 2-25% by weight |
| | n-butane (R600) and/or isobutane (R-600a) | 1-10% by weight |
| B) | 1,1,1,2-tetrafluoroethane (R134a) | 65-94% by weight |
| | 1,1,1,2,3,3,3-heptafluoropropane (R227ea) | 5-25% by weight |
| | n-butane (R600) and/or isobutane (R-600a) | 1-10% by weight |

Said compositions have zero ODP, very low GWP and good solvent power for mineral lubricants. They are utilizable as drop-in substituents of R-12 in domestic refrigeration.

9 Claims, No Drawings

NEAR-AZEOTROPIC TERNARY COMPOSITIONS CONSTITUTED BY HYDROGENATED FLUOROCARBONS AND HYDROCARBONS, SUITABLE AS REFRIGERATING FLUIDS

Matter enclosed in heavy brackets [ ] appears in the original patent but forms no part of this reissue specification; matter printed in italics indicates the additions made by reissue.

The present invention relates to near-azeotropic compositions utilizable as refrigerating fluids in circuits working according to the Rankine cycle. More particularly the present invention relates to compositions having zero ODP (Ozone depleting Potential) value and low GWP (Global Warming Potential) and VOC (Volatile Organic Compound) values, utilizable as low environmental impact substituents of dichlorodifluoromethane (R-12).

R-12 has been widely used as refrigerating fluid for circuits working at middle-high evaporation temperatures, typical of the domestic refrigeration and of the housing and motorvehicles air-conditioning. At present the manufacturing and marketing of R-12, and generally of chlorofluorocarbons, are submitted to restrictive rules in all the world for applications of this kind because of the alleged destroying power of this product on the ozone layer present in the stratosphere.

Therefore, the need of finding other products or compositions capable of effectively replacing R-12 without causing environmental damages, is particularly felt. For this purpose, it was suggested the use of hydrofluorocarbons (HFC) or hydrochlorofluorocarbons (HCFC), whose depleting potential with respect to ozone (ODP) is very low or even zero, as very low is also their contribution to the so called "greenhouse effect", measured by the GWP.

Among the various substitute products of R-12 up to now proposed, the most known is 1,1,1,2-tetrafluoroethane (R-134a), a product having a low environmental impact (ODP=0); GWP=0.35) and properties similar to those of R-12. However R-134a shows as refrigerant a coefficient of performance lower than that of R-12 and, on the other side, it is not compatible with the conventional lubricants of mineral type, therefore its use as refrigerating fluid requires on the one hand a new planning of the refrigerating circuit to avoid higher energy consumptions and on the other hand the substitution of the lubricating oil with another compatible oil. The oil conventionally used with R-12 is indeed of the mineral type while that required by R-134a belongs to the esterified polyols class and the two lubricants are not compatible.

In order to overcome the drawbacks shown by R-134a, alike other single refrigerants, the use of mixtures containing HFC has been proposed. However, if mixtures are used, other inconveniences are encountered. First of all, because of the different volatility of the components, fractionation occurs when passing from liquid phase to vapour phase and vice-versa, with a remarkable variation in the condensation and evaporation temperatures, so as to impair even considerably the efficiency of the refrigerating circuit. Moreover, the filling up of the refrigerant, necessary in consequence of unavoidable losses from the refrigerating plant, cannot be carried out with the original mixture, but it is necessary to proportion the various components according to the exact composition of the mixture remained after fractionation, so as to restore the initial optimum composition. Lastly, if the mixture contains a more volatile, inflammable component, the vapour phase enriches in such component until the inflammability point is reached, with evident hazard during its use. Similarly, if the inflammable component is less volatile, it concentrates in the liquid phase, giving rise to an inflammable liquid.

In order to avoid such drawbacks, it is therefore convenient to use mixtures having an azeotropic behaviour, i.e. mixtures characterized in that they behave as pure fluids. However, the obtainment of azeotropic mixtures is an extremely rare event, since it requires a particular combination of boiling temperatures and deviations from the ideal behaviour of the various components. Therefore, the study of refrigerating mixtures has been directed to the obtainment of "near-azeotropic" mixtures. The definition, among those suggested until now, which better suits the purposes of the present invention, is that according to which a near-azeotropic behaviour occurs if the percentage pressure variation in consequence of a 50% evaporation of the liquid (indicated as $\Delta p/p$ per 100) at 25° C. is lower than 15% (in this respect see the article by D. A. Didion and D. B. Bivens in Int. J. Refrig., vol. 13, p. 163 and following, 1990).

A further characteristic desirable for the substituents of chlorofluorocarbons (CFC)-based refrigerants, as already mentioned, is that they shall not virtually require any modifications of elements, materials and, generally, components of the system in which they operate: in this case we can speak of "drop-in" substituents. In particular, it would be advantageous having a product or a mixture soluble in the lubricating mineral oils commonly used with conventional refrigerants, or soluble in an oil compatible with the oils used at present. In such a way, before introducing the new refrigerant, complex operations of complete discharging, accurate washing and drying of the refrigerating plants would be avoided.

In EP 299614 various near-azeotropic mixtures of halocarbons are proposed as substituents of R-12 in the refrigerating field. The mixtures of this kind on the one hand still show not zero ODP values because of the presence of chlorine atoms in one or more components, on the other hand, according to what ascertained by the Applicant, require the use of an alkylbenzenic lubricating oil, with the drawbacks described above.

In EP 565265 are described mixtures containing R-134a, an hydrocarbon selected from propane, propylene or isobutane and optionally octafluoropropane (R-218). Although these mixtures are an improvement compared with R134a used alone, they show the drawback of a notable deviation from the azeotropic behaviour. See in particular col. 3, lines 13-15.

In EP 638623, in the name of the Applicant, mixtures as substituents of R-12 and R-502 are described, however some of them have not the feature of being "drop-in", while for others it has been found that they do not have sufficient chemical stability during the use.

The Applicant has unexpectedly found that HFC-based mixtures containing hydrocarbons as hereinunder defined, have near-azeotropic behaviour, are non-flammable up to an hydrocarbon content of about 4% by weight or only slightly flammable for an hydrocabon content higher than 4% and up to 10% by weight and are characterized by vapour pressure curves such as to make them particularly suitable as substituents for refrigerants R-12, by enjoying moreover of the feature of being "drop-in". Such mixtures are moreover characterized by a very low or zero environmental impact, expressed in terms of ODP, GWP and VOC.

Therefore, object of the present invention are ternary mixtures, utilizable as refrigerating fluids, essentially of the following types:

| | | |
|---|---|---|
| A) | 1,1,1,2-tetrafluoroethane (R134a) | 65-94% by weight |
| | pentafluoroethane (R125) | 2-25% by weight |
| | n-butane (R600) | 1-10% by weight |
| B) | 1,1,1,2-tetrafluoroethane (R134a) | 65-94% by weight |
| | pentafluoroethane (R125) | 2-25% by weight |
| | isobutane (R600a) | 1-10% by weight |
| C) | 1,1,1,2-tetrafluoroethane (R134a) | 65-94% by weight |
| | pentafluoroethane (R125) | 2-25% by weight |
| | n-butane (R600) and isobutane (R600a) | 1-10% by weight |
| D) | 1,1,1,2-tetrafluoroethane (R134a) | 65-94% by weight |
| | 1.1,1,2,3,3,3-heptafluoropropane (R227ea) | 5-25% by weight |
| | n-butane (R600) | 1-10% by weight |
| E) | 1,1,1,2-tetrafluoroethane (R134a) | 65-94% by weight |
| | 1,1,1,2,3,3,3-heptafluoropropane (R227ea) | 5-25% by weight |
| | isobutane (R600a) | 1-10% by weight |
| F) | 1,1,1,2-tetrafluoroethane (R134a) | 65-94% by weight |
| | 1,1,1,2,3,3,3-heptafluoropropane (R227ea) | 5-25% by weight |
| | n-butane (R600) and isobutane (R600a) | 1-10% by weight, |

said mixtures having the feature that the percent variation of the vapour pressure after the 50% evaporation of the liquid at the temperature of 25° C. is comprised between 0.5 and 15% of the vapour pressure before said evaporation and preferably between 0.5 and 7%. The n-butane is usually a commercial product which can contain up to 10% of isobutane. Similarly, isobutane is usually a commercial product which can contain up to 10% of n-butane.

Preferably A, B and C mixtures contain 75-86% of R134a, 4-20% of R-125 and 2-4% of hydrocarbon (R-600 and/or R-600a); the D, E and F mixtures contain 75-93% of R-134a, 5-20% of R-227ea and 2-4% of hydrocarbon (R-600 and/or R-600a), since these mixtures result non flammable. Unexpectedly, as already said, the mixtures containing only a little more than 4% of hydrocarbon result slightly flammable. Moreover the mixtures containing n-butane are preferred to those containing isobutane; this was unexpected as the azeotropic or near-azeotropic behaviour usually is found more easily when the boiling points of the components are closer.

Generally, the mixtures object of the present invention, being constituted by more refrigerants, show the advantage of a greater flexibility and therefore they meet better than one single component the thermodynamic and thermophysical characteristics required for a certain refrigerating circuit configuration.

As already said, the above mentioned mixtures are substituents of R-12 of drop-in type, as they can be used in the existing equipments concerning refrigeration at middle evaporation temperature, in particular in the domestic refrigeration, without needing the replacement of mechanical parts or of conventional mineral lubricating oils. This feature was unexpected if it is considered that the drop-in substituents of R-12 previously known contain chlorine. Once dissolved in the lubricating oil the invention mixtures, unlike those previously used, do not cause, also at high temperatures and for long contact times, noticeable alterations in the chemical-physical characteristics of both the oil and the metal surfaces usually present in the refrigerating circuits, revealing therefore a good chemical stability.

Moreover, thanks to the near-azeotropic characteristics, depending on the content of hydrocarbons, said mixtures show no or at most a slight tendency to fractionate into inflammable liquids or vapours also after a substantial evaporation of around 50% by weight.

It has also been unexpectedly found that even small percent amounts of n-butane or isobutane present in these mixtures allow to noticeably improve the solubility of conventional mineral lubricants in HFC, notoriously incompatible with these oils. Moreover is has been noticed that also when the solubility of the oil in the refrigerant is not optimum, the lubricating oil is unexpectedly capable of coming back from the evaporator, which represents the critical zone of the circuit, to the compressor, thus maintaining lubrication and avoiding wear phenomena of the compressor mechanical parts and undesired oil accumulations in the exchangers.

Some working examples of the present invention are hereinunder reported, whose purpose is merely illustrative but not limitative of the scope of the invention.

EXAMPLES 1-9 AND 15; COMPARATIVE EXAMPLES 10-14 AND 16-17

Various mixtures according to the present invention were prepared: the compositions, expressed as % by weight, are reported in Table 1. Each mixture was characterized according to the following tests:

(a) Near-azeotropic Behaviour

The mixture, of known composition and weight, was introduced into a previously evacuated small cylinder having an internal volume equal to 150 $cm^3$. The filling volume ratio was initially equal to 0.8. The cylinder was introduced into a thermostatic bath at 25° C. As soon as the equilibrium was reached, the inner pressure was measured by means of a pressure transducer. The content of the cylinder was then partly discharged by means of a suitable valve, until the cylinder weight reached a value corresponding to 50% of the initial charge, by keeping the temperature at 25° C. The pressure inside the tube was measured again at 25° C. The mixture had a near-azeotropic behaviour if the pressure drop, expressed as percentage with respect to the initial pressure ($\Delta p/p \cdot 100$), was comprised between 0.5 and 15%, preferably between 0.5 and 7%. For some mixtures also the value corresponding to the 90% evaporation of the starting mixture was reported. Although the $\Delta p/p \cdot 100$ value is not the direct measurement of the azeotropy, it is however indicative of an azeotropic behaviour.

In order to more stress the behaviour closer to the azeotropic one of the mixtures according to the invention compared with the mixtures of the prior art, there was measured the variation of the composition versus the amount of evaporated liquid at the temperature of 25° C. for a typical mixture according to the invention and for two mixtures of similar composition of the type described in EP 565265. The results are reported in Table 2. The composition of the comparative examples 14 of Table 1 and 17 of Table 2 practically reproduces the composition of example 2 of EP 565265. The improvement represented by the compositions of the invention results evident.

(b) Boiling Temperature

By using the same cylinder described above, filled with the refrigerating mixture up to a volume ratio of 0.8 and immersed into the thermostatic bath, the boiling temperature is determined by slowly reducing the temperature of the thermostatic bath until the equilibrium pressure of 1.013 bar is reached: the temperature corresponding to such a pressure is the boiling temperature of the mixture.

(c) Inflammability

The inflammability of the tested mixtures was determined according to a test which allowed to reveal flame propagation when the test mixture was supplied onto a burner put at a determined distance.

A burner with oxidizing flame constituted by a Bunsen burner was put near the zero point of a graduated horizontal rod, so that the third upper part of a 5 cm flame was at the same height of the delivering valve of a small spray cylinder. The test mixture was introduced in the cylinder and thermostated at the temperature of 20° C. The cylinder was put at the distance of 15 cm from the burner and the liquid phase of the mixture was supplied onto the flame.

The following inflammability evaluation criteria were adopted: the mixture was considered non-flammable if no propagation or increase of the burner flame was noticed; the mixture was considered slightly flammable if a slight increase of the flame without propagation was noticed; the mixture was considered flammable if propagation of the flame was noticed independently of the flame length. In case of the refrigerating mixtures of the invention the test was carried out on both liquid phases and on vapor phases at the equilibrium. Before carrying out the test all the mixtures were analyzed by gaschromatographic technique; the vapour phase of the mixtures was restored as liquid phase and delivered according to the test modalities.

For comparative purposes the data obtained with the binary mixtures R-134a/R-600 and R-134a/R-600a are reported. The presence of R-125 and R-227ea in the compositions according to the invention allows to improve the characteristics of non-flammability compared with said binary mixtures.

(e) ODP and GWP

They were calculated on the basis of the known values of the pure components constituting the mixture (weighted average), referred to $CFCl_3$.

EXAMPLE 18

Solubility of Mineral Oil in Refrigerating Mixtures.

A reference mineral oil (SHELL/CLAVUS 32) was introduced in a glass test tube having thick walls resistant to high pressures and closed at one end by a metal valve. After cooling, the refrigerating mixture to be tested was introduced in the test tube previously evacuated and the test tube was immersed in a thermostatic bath. The temperature was firstly slowly increased from 25° C. up to 60° C. (homogenous solution) and then reduced until clouding was noticed (cloudy point).

The experimental values obtained with the mixture R-125/R-134a/R-600 in the 10,90/84, 16/4,94 ratio and for comparative purposes, with R-134a and R-12, are reported in Table 3.

EXAMPLE 19

Wear Test

The test allows to point out possible anomalies in the compressor lubrication by observing the mechanical parts wear. The wear phenomena are connected to insufficient lubrication caused by poor return of the oil to the compressor or by noticeable decrease of the viscosity of the oil/refrigerant system which is no longer capable of lubricating the compressor mobile parts.

In a test refrigerant circuit, equipped with an alternative hermetic compressor for home refrigerators, a liquid mixture consisting of R-125/R-134a/R-600 in ratio by weight 10:85:5 is introduced. The used lubricating oil is a mineral oil ISO 32, commonly used with R-12. The compressor is kept in continuous working for 1000 hours, by adjusting the delivery pressure at 20 bar. This period being elapsed the compressor mechanical parts are submitted to a visual observation, in order to identify anomalous wear phenomena. The evaluations are carried out on the basis of a comparative test with the conventional refrigerant R-12. The refrigerant and oil amounts in the two tests are the same. The results are reported in Table 4.

EXAMPLES 20 and 21

Tests of Chemical Stability

The mixtures according to the invention were submitted to a chemical stability test in the presence of metals (copper and steel), according to ASHRAE Method 97-1983, with some minor modifications, as reported hereinafter.

One copper and one steel coupon and about 1 ml of mineral oil such as SHELL CLAVUS 32 were introduced into a glass tube, having a 4.5 mm diameter and a 250 mm height.

The glass tube was then inserted into a steel cylinder fitted to contain exactly the tube, and equipped with a valve. The cylinder was evacuated, cooled and then loaded with 1 ml of refrigerating mixture. The cylinder was then closed and put in a stove at 175° C. for 14 days.

After such treatment, the refrigerant was analyzed by gaschromatography to detect the presence of possible by-products deriving from degradation reactions of the refrigerant. The oil was titrated to determine the possible increase of the acidity (expressed as mg KOH/g oil). The metal coupons were submitted to visual examination to reveal possible surface changes due to corrosion and formation of deposits.

The evaluations are carried out by considering as reference a system constituted by R-12/oil/metals. The results obtained with the two mixtures according to the invention are reported in Table 5.

TABLE 1

Near-azeotropic compositions: chemical-physical data

| Ex. | Composition (% by weight) | | Vapour tension at 25° C. (bar) | Density at 25° C. | Vapour composition in equilibrium at 25° C. (% by weight) | | Near-azeotropic behavior (ΔP/p 100) −50% | −90% | B.P. ° C. | Flammability** Liq. | Vap. | ODP*** | GWP*** |
|---|---|---|---|---|---|---|---|---|---|---|---|---|---|
| 1 | R-125 | 9.8 | 7.83 | 1.14 | R-125 | 17.2 | 4.72 | 10.98 | −30.0 | S.F. | S.F. | 0 | 0.32 |
| | R-134a | 85.3 | | | R-134a | 76.4 | | | | | | | |
| | R-600 | 4.9 | | | R-600 | 6.4 | | | | | | | |

TABLE 1-continued

Near-azeotropic compositions: chemical-physical data

| Ex. | Composition (% by weight) | | Vapour tension at 25° C. (bar) | Density at 25° C. | Vapour composition in equilibrium at 25° C. (% by weight) | | Near-azeotropic behavior (ΔP/p 100) −50% | −90% | B.P. ° C. | Flammability** Liq. | Vap. | ODP*** | GWP*** |
|---|---|---|---|---|---|---|---|---|---|---|---|---|---|
| 2 | R-125 | 10.4 | 7.78 | 1.15 | R-125 | 16.0 | 5.14 | 10.92 | −29.8 | N.F. | S.F. | 0 | 0.33 |
| | R-134a | 85.6 | | | R-134a | 78.8 | | | | | | | |
| | R-600 | 4.0 | | | R-600 | 5.2 | | | | | | | |
| 3 | R-125 | 16.6 | 8.15 | 1.17 | R-125 | 25.9 | 5.77 | 13.50 | −32.0 | N.F. | N.F. | 0 | 0.36 |
| | R-134a | 81.0 | | | R-134a | 70.8 | | | | | | | |
| | R-600 | 2.4 | | | R-600 | 3.3 | | | | | | | |
| 4 | R-125 | 12.8 | 7.79 | 1.17 | R-125 | 20.6 | | | −31.0 | N.F. | N.F. | 0 | 0.35 |
| | R-134a | 84.6 | | | R-134a | 75.8 | | | | | | | |
| | R-600 | 2.6 | | | R-600 | 3.6 | | | | | | | |
| 5 | R-125 | 6.6 | | 1.17 | | | | | −29.0 | N.F. | | 0 | 0.31 |
| | R-134a | 91.0 | | | | | | | | | | | |
| | R-600 | 2.4 | | | | | | | | | | | |
| 6 | R-125 | 10.6 | | 1.16 | R-125 | 16.4 | | | −33.0 | N.F. | S.F. | 0 | 0.33 |
| | R-134a | 86.3 | | | R-134a | 78.7 | | | | | | | |
| | R-600a | 3.1 | | | R-600a | 4.9 | | | | | | | |
| 7 | R-125 | 9.1 | 7.95 | 1.14 | R-125 | 143 | 5.03 | 12.08 | −34.0 | S.F. | F. | 0 | 0.32 |
| | R-134a | 85.8 | | | R-134a | 78.2 | | | | | | | |
| | R-600a | 5.1 | | | R-600a | 7.5 | | | | | | | |
| 8 | R-227ea | 24.0 | 6.60 | 1.18 | R-227ea | 19.3 | 2.88 | 5.30 | −26.0 | N.F. | S.F. | 0 | 0.40 |
| | R-134a | 71.0 | | | R-134a | 74.0 | | | | | | | |
| | R-600 | 5.0 | | | R-600 | 6.7 | | | | | | | |
| 9 | R-227ea | 9.0 | 7.35 | 1.15 | R-227ea | . . . | 4.15 | 9.98 | −32.0 | | | 0 | 0.32 |
| | R-134a | 86.0 | | | R-134a | . . . | | | | | | | |
| | R-600a | 5.0 | | | R-600a | . . . | | | | | | | |
| 10* | R-12 | 100 | 6.43 | 1.22 | R-12 | 100 | 0.00 | 0.00 | −29.5 | N.F. | N.F. | 1 | 2.93 |
| 11* | R-134a | 94.9 | | 1.14 | R-134a | 93.0 | | | −27.0 | F. | F. | 0 | 0.27 |
| | R-600 | 5.1 | | | R-600 | 7.0 | | | | | | | |
| 12* | R-134a | 95.0 | | 1.14 | R-134a | 91.5 | | | −32.5 | F. | F. | 0 | 0.27 |
| | R-600a | 5.0 | | | R-600a | 8.5 | | | | | | | |
| 13* | R-218 | 9.2 | 8.19 | 1.15 | R-218 | 17.8 | 7.69 | 15.26 | −36.0 | | | 0 | |
| | R-134a | 85.8 | | | R-134a | 75.7 | | | | | | | |
| | R-600a | 5.0 | | | R-600a | 6.5 | | | | | | | |
| 14* | R-218 | 8.7 | 9.85 | 1.10 | R-218 | 17.5 | 20.81 | 31.67 | −45.0 | | | 0 | |
| | R-134a | 85.9 | | | R-134a | 69.5 | | | | | | | |
| | R-290 | 5.4 | | | R-290 | 13.0 | | | | | | | |

*comparative example

**F. = flammable; N.F. = non flammable; S.F. =slightly flammable.

***with respect to $CFCl_3$

TABLE 2

Variation of composition versus the amount of liquid evaporated at the temperature of 25° C.

| Ex. | Components | Initial composition and after evaporation of 50 and of 90% by weight (% by weight) $C_1$ liq. | $C_1$ vap. | $C_{(-50\%)}$ liq. | $C_{(-50\%)}$ vap. | $C_{(-90\%)}$ liq. | $C_{(-90\%)}$ vap. | Variation of the liquid composition (Δ % in peso) after 50% evap. | after 90% evap. | % Variation of the components in the liquid ((Δ %/$C_1$ %) after 50% evap. | after 90% evap. |
|---|---|---|---|---|---|---|---|---|---|---|---|
| 15 | R-125 | 9.8 | 17.2 | 5.0 | 11.8 | 2.5 | 2.9 | −4.8 | −7.3 | −49.0 | −74.5 |
| | R-134a | 85.3 | 76.4 | 91.5 | 82.7 | 95.4 | 94.8 | +6.2 | +10.1 | +7.3 | +11.8 |
| | R-600 | 4.9 | 6.4 | 3.5 | 5.5 | 2.1 | 2.3 | −1.4 | −2.8 | −28.0 | −57.1 |
| 16* | R-218 | 9.2 | 17.8 | 3.5 | 9.6 | 0.4 | 1.4 | −5.7 | −8.8 | −62.3 | −95.6 |
| | R-134a | 85.8 | 75.7 | 92.9 | 84.5 | 98.4 | 96.2 | +7.1 | +12.6 | +8.3 | +14.7 |
| | R-600a | 5.0 | 6.5 | 3.6 | 5.9 | 1.2 | 2.4 | −1.4 | −3.8 | −28.0 | −76.0 |
| 17* | R-218 | 8.7 | 17.5 | 3.1 | 9.0 | 0.2 | 0.6 | −5.6 | −8.5 | −64.4 | −97.7 |
| | R- 134a | 85.9 | 69.5 | 95.7 | 86.2 | 99.7 | 99.3 | +9.8 | +13.8 | +11.4 | +16.1 |
| | R-290 | 5.4 | 13.0 | 1.2 | 4.8 | 0.1 | 0.1 | −4.2 | −5.3 | −77.8 | −98.1 |

*comparative example

TABLE 3

Solubility of mineral oil in refrigerating mixtures

| Concentration of the oil (*) % by weight | Demixing critical temperature (cloudy point) ° C. Example 18 R-125/R-134a/R-600 = 10,90/84,16/4,94 | R-134a | R-12 |
|---|---|---|---|
| 0.14 | +12 | +36 | <−70 |
| 0.26 | | +45 | <−70 |
| 0.23 | +18 | +49 | |
| 0.30 | +24 | +58 | <−70 |
| 0.35 | +30 | | <−70 |
| 1.94 | | >+60 | |
| 2.08 | >+60 | | |

(*) Olio SHELL/CLAVUS 32

TABLE 4

Wan tests of the compressor (*).

| Mechanical pans | Example 19 R-125/R-134a/R-600 = 10/85/5 | R-12 |
|---|---|---|
| SHAFT: | | |
| eccentric | 1 | 1 |
| long shank | 2 | 1 |
| BODY: | | |
| cylinder | 1 | 1 |
| hub | 1 | 1 |
| PISTON | 1 | 1 |
| CONNECTING ROD | 1 | 1 |
| VALVE | SD | SC |
| PLATE VALVE | SD | SC |

(*) Analysis codification:
1 Homogeneous slight polishing without scorings
2 Non homogeneous slight polishing without scorings
SD Slight deposit
SC Slight colouring

TABLE 5

Chemical stability tests (Modified ASHRAE TEST 97-1983 14 days at 175° C.) (*)

| | Comparison | Example 20 | Example 21 |
|---|---|---|---|
| Refrigerant (% by weight) | R-12 100 | R-125 10.0<br>R-134a 85.0<br>R-600 5.0 | R-227ea 24.0<br>R-134s 71.0<br>R-600 5.0 |
| Humidity in the refrigerant | 13 ppm | 15 ppm | 15 ppm |
| Oil | mineral | mineral | mineral |
| Humidity in the oil | 35 ppm | 35 ppm | 35 ppm |
| Metal | Cu; AISI-316 | Cu; AISI-316 | Cu; AISI-316 |
| RESULTS | | | |
| Visual evaluation: | | | |
| Cu | B | B | B |
| AISI-316 | U | U | U |
| oil | SC | SC | SC |
| Acidity (mg KOH/g oil): | | | |
| before | <0.01 | <0.01 | <0.01 |
| after | 0.15 | 0.08 | 0.09 |
| Gaschromatographic analysis: by-products (%, by weight) | 0.18 (**) | <0.01 | <0.01 |

(*) Analysis codification:
SC = slight colouring
U = unaltered
B = browning
(**) by-product R-22

What is claimed is:

1. Drop-in substitutes for R 12 consisting of ternary near-azeotropic compositions:

| | |
|---|---|
| 1,1,1,2-tetrafluoroethane (R 134a) | 75-86% by weight |
| pentafluoroethane (R125) | 4-20% by weight |
| n-butane (R 600) | 2-4% by weight |
| or | |
| 1,1,1,2-tetrafluoroethane (R 134a) | 75-93% by weight |
| 1,1,1,2,3,3,3-heptafluoropropane (R 227ea) | 5-20% by weight |
| n-butane and/or isobutane (R 600 & R 600a) | 2-4% by weight |

said compositions having the feature that the percent variation of the vapor pressure after 50% percent evaporation of the liquid at a temperature of 25° C. is comprised between 0.5 and 7% of the vapor pressure before said evaporation.

2. A method of refrigeration comprising condensing and evaporating the compositions of claim 1.

*3. The drop-in substitutes as claimed in claim 1 wherein the drop-in substitutes consists of the following ternary near-azeotropic composition:*

*1,1,1,2-tetrafluoroethane (R 134a),*

*pentafluoroethane (R 125) and*

*n-butane (R 600).*

*4. The drop-in substitutes as claimed in claim 1 wherein the drop-in substitutes consists of the following ternary near-azeotropic composition:*

*1,1,1,2-tetrafluoroethane (R 134a),*

*1,1,1,2,3,3,3-heptafluoropropane (R 227ea) and*

*n-butane and/or isobutane (R 600 & R 600a).*

*5. A method of refrigeration which comprises evaporating and condensing a refrigerant mixture which can be obtained by adding HFC-125 to a mixture of HFC-134a and n-butane, wherein the presence of HFC-125 causes the flammability characteristics of the refrigerant mixture to be improved as compared to the flammability of the mixture of HFC-134a and n-butane.*

*6. The method of claim 5, wherein the n-butane content of the refrigerant mixture is from 2 to 4 wt. %.*

*7. A method for maintaining lubrication of mechanical parts of a compressor included in a refrigeration circuit, which comprises using a compatibilized lubricant-refrigerant mixture formed by combining a lubricant with a refrigerant mixture in accordance with claim 5.*

*8. The method according to claim 7, wherein the lubricant is mineral oil.*

*9. The method of claim 5, wherein the n-butane content of the refrigerant mixture is from 2 to 4 wt. %.*

* * * * *